US009352697B2

(12) United States Patent
Knott

(10) Patent No.: US 9,352,697 B2
(45) Date of Patent: May 31, 2016

(54) CLAMP

(76) Inventor: Roy William Knott, Bromley (GB)

(*) Notice: Subject to any disclaimer, the term of this patent is extended or adjusted under 35 U.S.C. 154(b) by 136 days.

(21) Appl. No.: 13/261,406

(22) PCT Filed: Feb. 22, 2010

(86) PCT No.: PCT/GB2010/000305
§ 371 (c)(1),
(2), (4) Date: Aug. 17, 2012

(87) PCT Pub. No.: WO2011/101606
PCT Pub. Date: Aug. 25, 2011

(65) Prior Publication Data
US 2012/0325875 A1     Dec. 27, 2012

(51) Int. Cl.
*B60R 9/048* (2006.01)

(52) U.S. Cl.
CPC .................... *B60R 9/0485* (2013.01)

(58) Field of Classification Search
CPC ......... B60P 7/083; B60P 3/073; B60R 9/048; B60R 9/0485
USPC .................... 224/324, 319; 410/100, 103, 12; 254/231
See application file for complete search history.

(56) References Cited

U.S. PATENT DOCUMENTS

| 721,946 | A |   | 3/1903  | Foster |   |
|---|---|---|---|---|---|
| 1,276,702 | A |   | 8/1918  | Anderson |   |
| 3,240,473 | A | * | 3/1966  | Coffey | B60P 7/083 254/220 |
| 4,223,869 | A |   | 9/1980  | Patterson, III et al. |   |
| 5,971,178 | A | * | 10/1999 | Ratcliff et al. | 212/271 |
| 6,572,083 | B1 | * | 6/2003  | Topping et al. | 254/375 |
| 6,957,938 | B1 | * | 10/2005 | Beasley | 410/100 |
| 7,175,162 | B1 | * | 2/2007  | Ratcliff | 254/231 |
| 8,434,979 | B1 | * | 5/2013  | Genge | B61D 45/001 410/103 |

FOREIGN PATENT DOCUMENTS

| GB | 2462721 A | 2/2010 |
|---|---|---|
| WO | 9942400 A2 | 8/1999 |
| WO | 2005087540 A1 | 9/2005 |

OTHER PUBLICATIONS

International Search Report dated Dec. 7, 2010 for corresponding International Application No. PCT/GB2010/000305, filed Feb. 22, 2010.
Written Opinion of the International Searching Authority dated Dec. 7, 2010 for corresponding International Application No. PCT/GB2010/000305, filed Feb. 22, 2010.

* cited by examiner

*Primary Examiner* — Corey Skurdal
(74) *Attorney, Agent, or Firm* — David D. Brush; Westman, Champlin & Koehler, P.A.

(57) ABSTRACT

A clamp for clamping an article to an anchor member, the clamp comprising at least one connecting member for positioning the clamp to an article, and tightening means for tightening the connecting member and thereby cause the clamp to clamp the article to an anchor member, and the clamp being such that it is portable, the connecting member is a flexible connecting member, the connecting member is extendable being pushed from and retractable into a housing, the continuous tightening and releasing means comprises operating parts which are housed in the housing, the tightening and releasing means being such that it is connected to a rod and in use is arranged to move traveling to and fro along the housing. The tightening means is so arranged to act upon the housings body absorbing and holding fast the clamping forces involved that otherwise often transfer there movement from the tightening means in other devices.

8 Claims, 13 Drawing Sheets

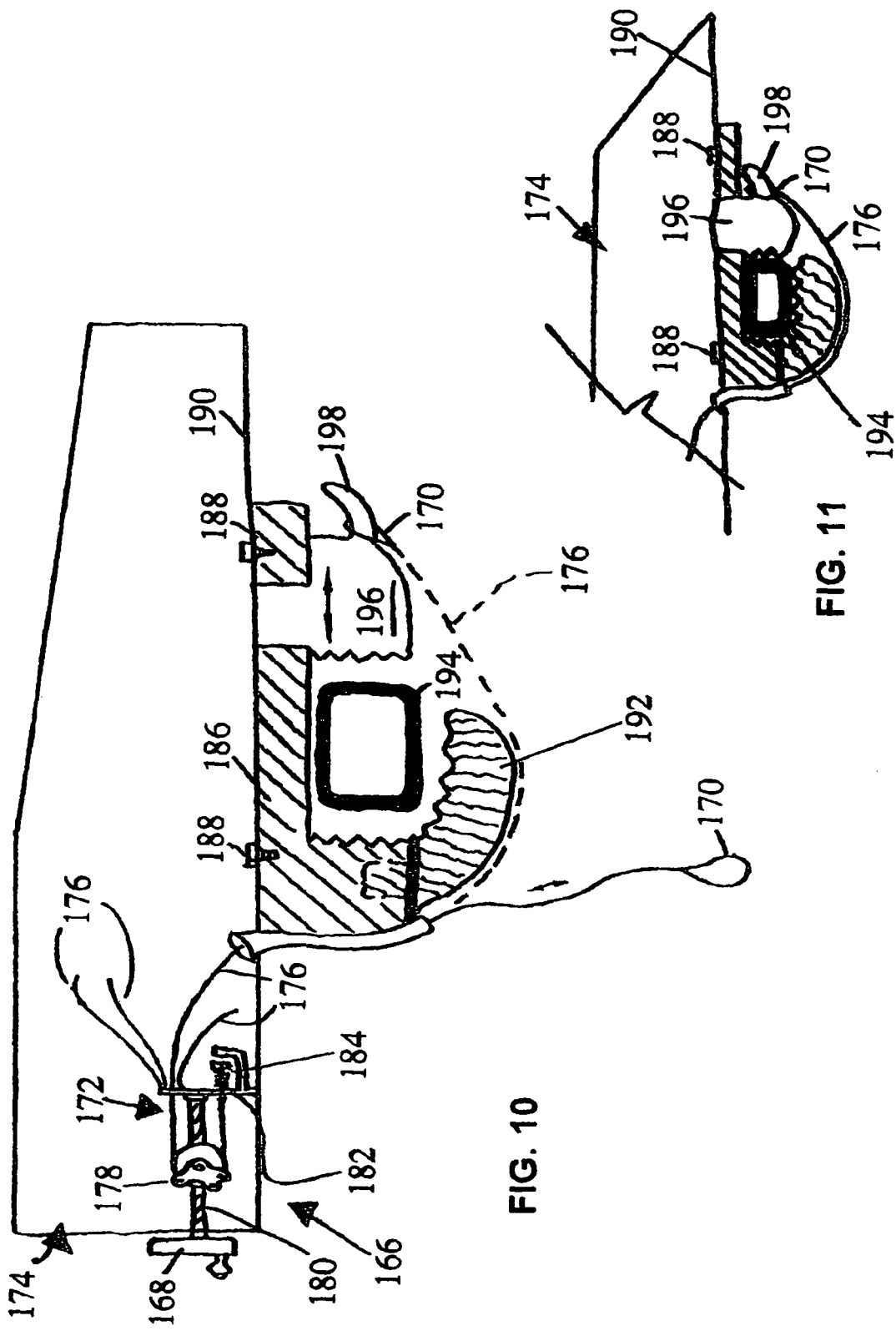

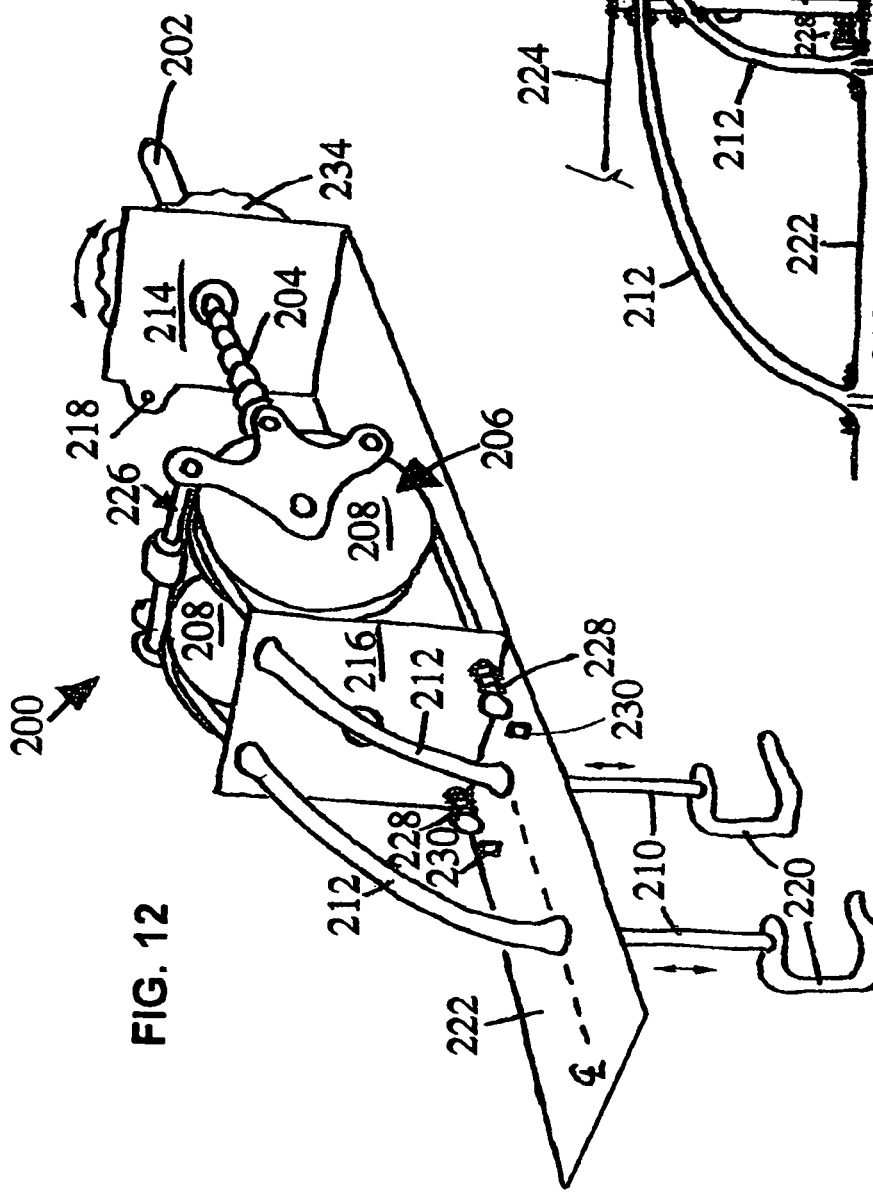
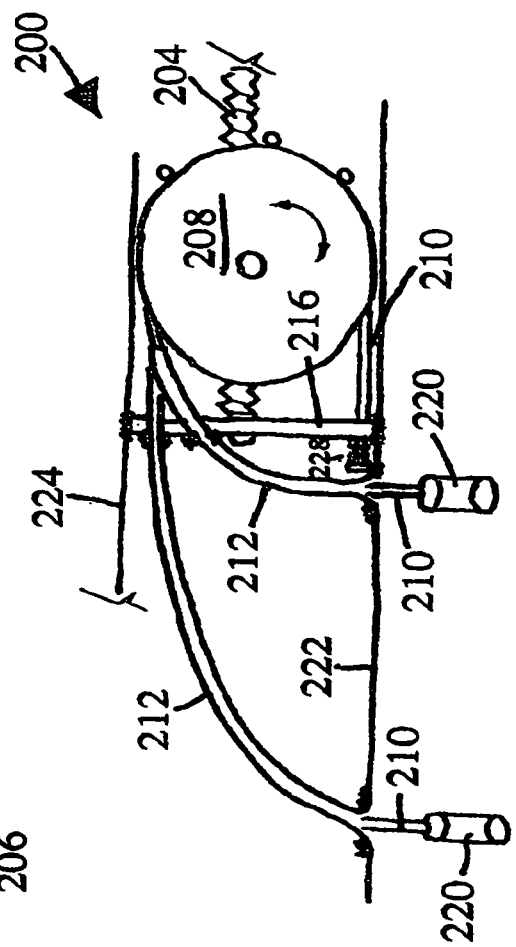
FIG. 12
FIG. 13

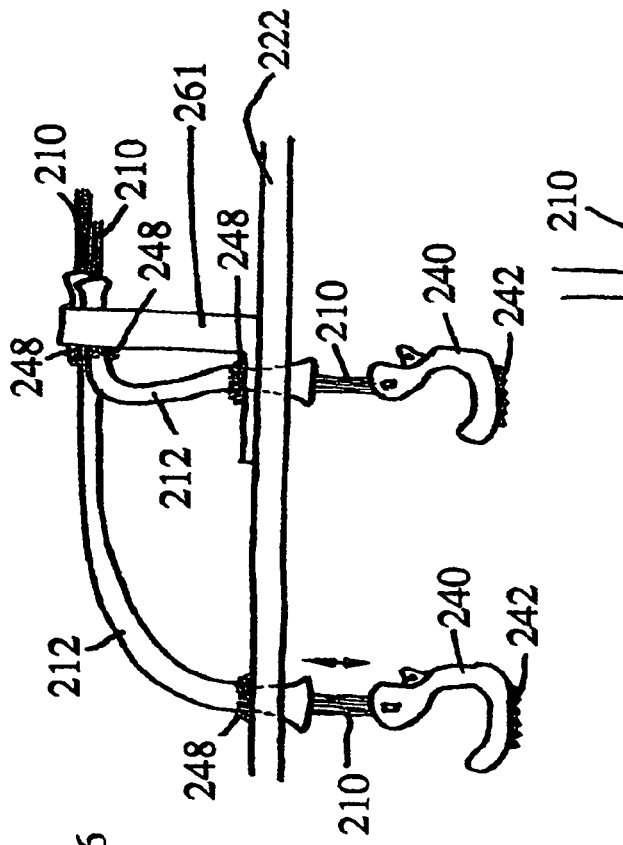
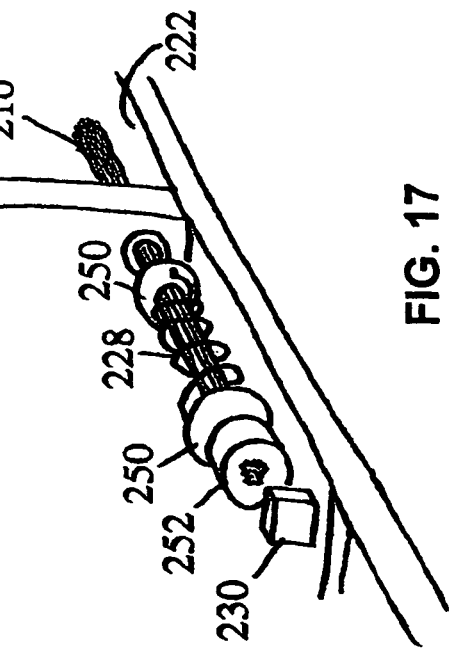
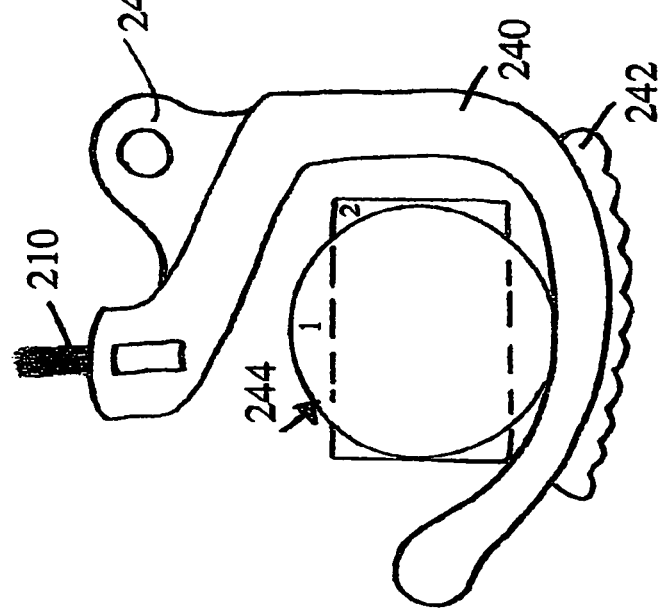
FIG. 16
FIG. 17
FIG. 15

CLAMP

This invention relates to a clamp. The clamp maybe used for clamping an article to an anchor member.

Clamps are known for clamping an article to an anchor member. One such clamp is for clamping an article in the form of a ladder to an anchor member in the form of a roof rack on top of a car, van, or other vehicle. This known clamp comprises a connecting member for connecting the clamp through the ladder, and tightening means for tightening the connecting member and thereby causing the clamp to clamp the article to the roof rack.

The connecting member is a hook which locates underneath a cross bar member of the roof rack. The tightening means is in the form of a hand turned bar which is screwed down a threaded upstanding rod in order to course a clamp bar to be tightened onto the ladder so that the clamp is able to clamp the ladder to the cross bar member of the roof rack.

This known clamp is not entirely satisfactory in that it often requires two hands in order to enable the hand turning bar to be tightened and the clamping bar held from turning whilst the hook is located. Also, the threaded bar extends upwardly from the roof of the car, van or other vehicle and this often increases the height of the vehicle too much, with the result that the threaded bar may catch on something, for example the top of an entrance to a garage or car park height restriction barrier.

If the vehicle should overturn in an accident, then a person may be impaled on the threaded bar or the hand turning bar. The threaded bar often rusts and ceases up. Further, the hand turned bar and hook are often or impossible to access without climbing, with it being necessary to stretch to the middle of the vehicle. Further, when tightening the hand turned bar it is easy for a user to skin their knuckles whilst preventing the clamping bar from turning, especially when rusted up. Further, the vehicles roof rack cross bar and side fittings will deform if the centre hook is over tightened by the hand turned bar.

Another such known clamp uses the ratchet and pawl method for securing and strapping down ladders, goods and cargo for transport and general use. This known clamp is not entirely satisfactory in that it suffers problems such as the webbing can twist, fold and tangle around the clamps open mechanism that requires its lacing and pulling from the devices, including chains and cords prior to there clamping use. Operators can skin their knuckles on the open ratchet teeth and the devices can become fouled with dirt. When tightening straps on heavy cargo whilst controlling the pawl the tightening lever can slip or break sending the operator and cargo flying. When tightening the ratchet the leverage force is transferred onto the clamps housing, twisting and calling for strong holding stabilisation from the operator. When releasing the clamping tension from the devices the operator must again interrupt by taking the clamping strain onto the lever in order to release the holding pawl from the ratchet spool, thus releasing the load.

It is the aim of the present invention to reduce the above-mentioned problems.

Accordingly in one non limiting embodiment of the present invention there is provided a clamp for clamping an article to an anchor member, the clamp comprising at least one connecting member for positioning the clamp to an article, and tightening means for tightening the connecting member and thereby cause the clamp to clamp the article to an anchor member, and the clamp being such that it is portable, the connecting member is a flexible connecting member, the connecting member is extendable being pushed from and retractable into a housing, the continuous tightening and releasing means comprises operating parts which are housed in the housing, the tightening and releasing means being such that it is connected to a rod and in use is arranged to move travelling to and fro along the housing. The tightening means is so arranged to act upon the housings body absorbing and holding fast the clamping forces involved that otherwise often transfer there movement from the tightening means in other devices.

The clamp of the present invention is easier and faster to use than the above-mentioned known clamps. The clamp of the present invention is also safer in that it avoids the above-mentioned skinning of knuckles. There is no need to stretch and climb to the middle of the vehicle such as for example as a high van roof in order to operate ladder alignment, tightening and hook location. The clamp of the present invention is able to be designed with the housing sealed keeping out dirt and presenting a low height profile, there by affording less wind resistance than the above mentioned known ladder clamp. The low height profile is also advantageous in that the clamp is not so likely to catch on the top of low barrier entrances. The clamp of the present invention avoids problems with the ratchet and pawl devices in as much as doubling the task of taking the clamping tension to releases the pawl from the strapping spools, the effects of lacing, tangle and torque twist from levering up and taking the clamping strain.

The clamp of the present invention is able to be produced as a single portable unit, which is easily kept clean. The clamp of the present invention maybe tightened from the kerb side only, thereby avoiding a fitter having to go onto the road way to locate and tighten things as occurs with known clamps. The clamp of the present invention maybe used for connecting a wide variety of articles to a wide variety of anchor members. Thus, for example, the article maybe a ladder, skies, posts, panels or general goods which require connecting to an anchor member such for example the cross bar of a roof rack on a vehicle. Generally, the anchor member maybe an appropriate anchor member to which an article needs to be clamped or maybe the clamps body or hook itself as the clamping member. The anchor member may also be the crossbar forming a roof rack for an easy one-side fix and removal operation.

The clamp of the present invention maybe one in which the operating parts extends longitudinally of the housing, this facilitates producing the clamp with a low profile.

The rod preferably comprises a threaded rod and the operating parts of the tightening means may comprise the threaded rod, and a tightening arrangement, which operates consequent upon rotation of the threaded rod.

The tightening arrangement maybe a gear wheel or a pulley wheel. In this case the clamp maybe one in which an arm and axle, and in which the arm and axle is pivotable travelling back and forth in a guide slot in the housing.

The threaded rod maybe rotated by a hand wheel positioned outside of the housing. In this case, the clamp maybe one in which the hand wheel is located at one end of the housing, and in which the hand wheel in a plain at right angles to the longitudinal axis of the threaded rod.

In an alternative embodiment of the invention, the clamp maybe one in which the operating parts comprises a piston, rod and a cylinder arrangement.

The piston, rod and cylinder arrangement is preferably hydraulically operated or motorised. In a further alternative embodiment of the invention, the clamp maybe one in which the operating parts comprise a threaded rod having a first part with a screw thread of one hand and a second part with a screw thread of the opposite hand.

In the embodiments of the invention, the connecting member maybe a cable, chain or strap. The cable maybe in the form of steel wire cord. The connecting member, for example the cable, chain or strap may pass through one or more guide conduits or rollers and slides which give a smooth passage for the connecting members, and which also gives added structural strength to the clamp where guide conduits and bulk heads are used further enabling the device to be manufactured from lighter materials.

Where the connecting member passes through a guide conduit, or guide bulkhead. The connecting member may have a stop member with a spring abutting the stop member in order to tension the connecting member with respect to the guide conduit and or bulkhead. The connecting member preferable terminates in a hook. The hook maybe for connecting to an anchor member or the anchor member may become the hook itself.

Alternatively, the hook maybe for connecting to the housing if the connecting member is passed around an article. The connecting member may terminate in connecting formations other than a hook to facilitate other purposes.

The clamp may be one in which the housing has flat sides, where as one side may act and becoming a clamping face, and it is of square or rectangular cross section. Other shapes for the housing may be employed, for example for aerodynamic purposes where the clamp is to be used travelling on top of a vehicle. The housing maybe a closed sided housing or it may be an open-sided housing, for example, an open frame.

The clamp may include locking means for locking the tightening means in a tightened condition. The locking means may help to prevent theft of the article and/or the clamp by loosening the tightening means. The locking means may be a padlock, which are a key and/or combination operated. The tightening means maybe removed from the device altogether locking the clamp in a tightened condition. Other types of locking means maybe employed.

Embodiments of the invention will now be described solely by way of example and with reference to the accompanying drawings in which:

FIG. 10 is a side view of a seventh clamp of the present invention;

FIG. 11 shows a clamping part of FIG. 10 in a clamping arrangement to a roof rack cross bar;

FIG. 12 shows an eighth device of the present invention;

FIG. 13 is a side view of the device shown in FIG. 12;

FIG. 15 shows a hook forming part of a clamp device of the present invention;

FIG. 16 shows two hooks with wire cords passing through guide slots and forming part of a clamp device of the present invention;

FIG. 17 shows how a wire cord may be tensioned by a spring;

FIG. 19 is a side view showing the clamp device of FIG. 18 in use.

Figure 1:
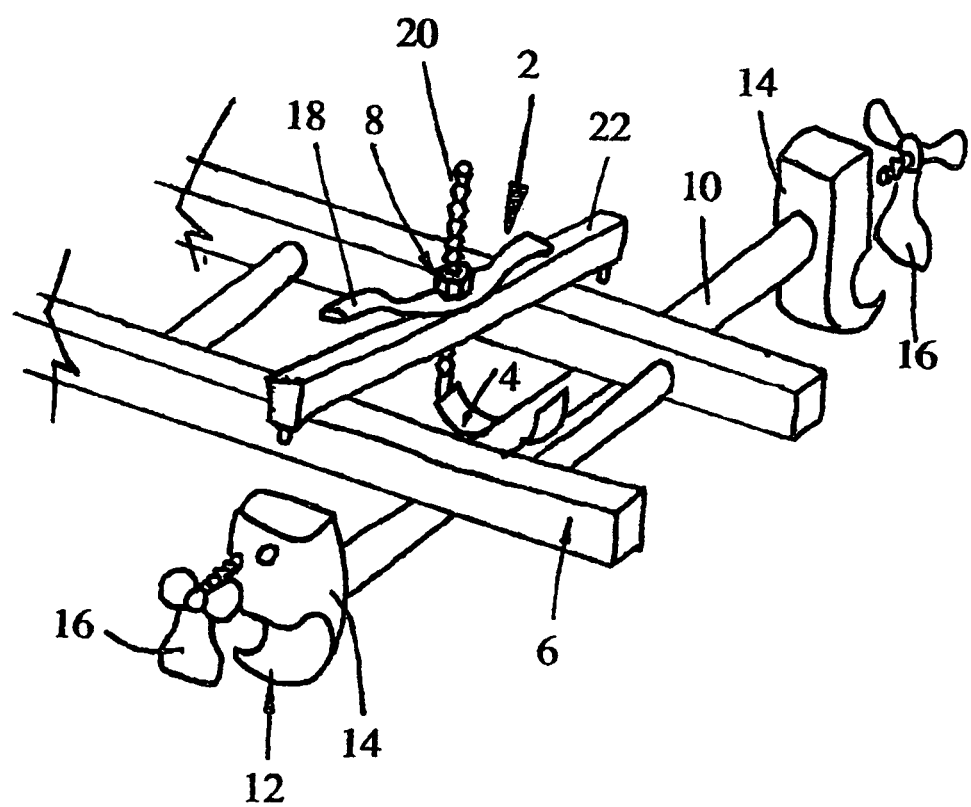
FIG. 1 is a perspective view showing a known clamp in use.

Referring to FIG. 1, there is shown a known clamp 2 comprising a connecting member 4 for connecting the clamp to an article in the form of a ladder 6. The clamp 2 also comprises tightening means 8 for tightening the connecting member 4 and thereby causing the clamp 2 to clamp the ladder 6 to an anchor member in the form of a cross bar 10 of a roof rack 12. The roof rack 12 comprises end connectors 14 which are positioned on opposite ends of the cross bar 10 and which are tightened by hand screws 16 to gullies on opposite sides of the roof of a vehicle (not shown).

The tightening means 8 comprises a hand turned bar 18 which is rotated by hand along a threaded upstanding rod 20 in order to cause a clamp bar 22 to become tightened on top of the ladder 6 as shown in FIG. 1. When the hand turned bar 18 is tight, the clamp 2 clamps the ladder 6 to the cross bar 10.

The clamp 2 is often difficult to use in that a person tightening the hand turned bar 18 along the threaded rod 20 may have to reach, climb and/or overstretch towards the middle of the roof of a vehicle. This is awkward, and it can also be dangerously tiring. The tightening of the hand turned bar 18 along the threaded rod 20 may take some time, and it will usually require two hands. In addition, it is easy for a user to skin their knuckles on the clamp bar 22, especially in wet or cold conditions, whilst rotating the hand turned bar 18 along the threaded rod 20. The rungs of the ladder 6 have to be aligned to miss the cross bar 10, and the threaded rod 20 has to be introduced to the cross bar 10 at an angle to the vertical.

Figure 2:
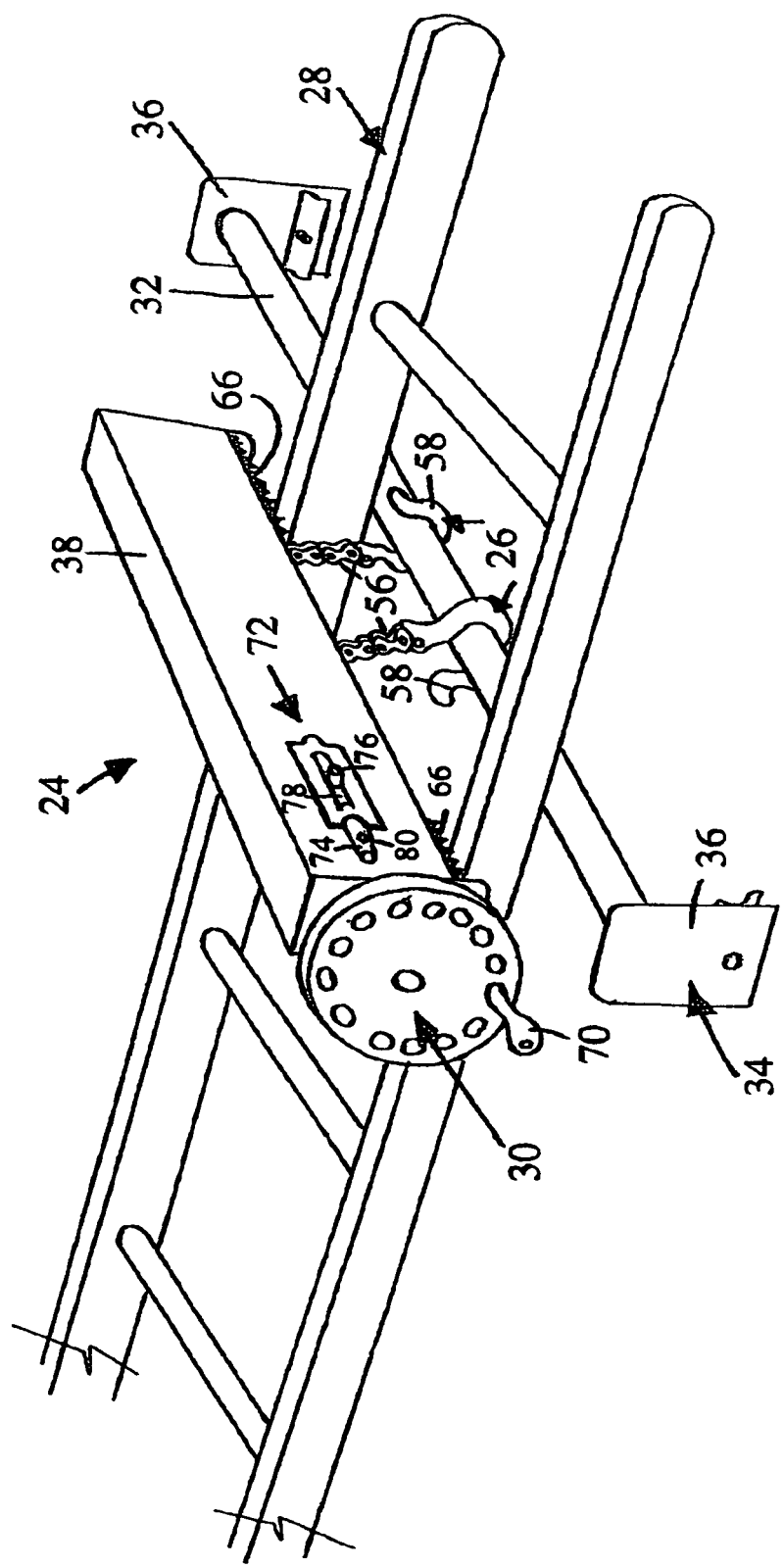
FIG. 2 is a perspective view of a first clamp of the present invention in use.
Figure 3:
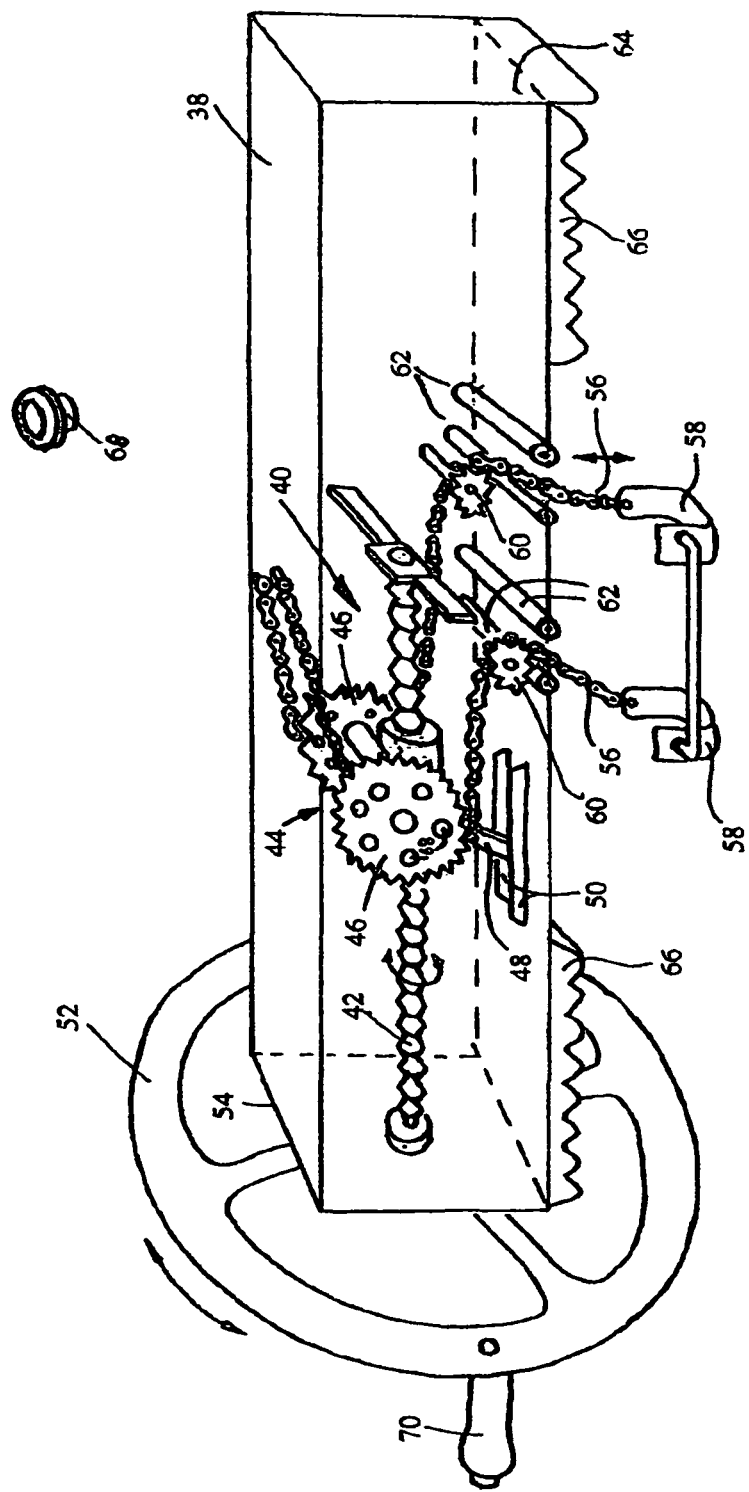
FIG. 3 shows in more detail operating parts of the clamp as shown in FIG. 2.

Referring now to FIGS. 2 and 3, there is shown a clamp 24 of the present invention. The clamp 24 comprises two connecting members 26. Each connecting member 26 is for connecting the clamp 24 to an article in the form of a ladder 28. The clamp 24 also comprises tightening means 30 for tightening the connecting members 26 and thereby causing the clamp 24 to clamp the ladder 28 to an anchor member in the form of a cross bar 32 of a roof rack 34. The roof rack 34 comprises end connectors 36 which clamp to gullies on opposite side of a roof of a vehicle (not shown).

The clamp 24 is such that each connecting member 20 is a flexible connecting member 26 in the form of a chain as shown. The connecting member 26 is extendable from and retractable into a housing 38. The tightening means 30 comprises operating parts 40 which are housed in the housing 38. The connecting member is able to be completely controlled as it extends from and retracts into the housing 38.

As best shown in FIG. 3, the operating parts 40 extend longitudinally of the housing 38. The operating parts 40 comprise a threaded rod 42 and a tightening arrangement 44. The tightening arrangement 44 operates consequent upon rotation of the threaded rod 42. The tightening arrangement 44 comprises a gear wheel 46. The gear wheel 46 operates on an arm 48. The arm 48 is pivotable to and fro in a guide slot 50 in the housing 38.

The threaded rod 42 is rotated by a hand wheel 52 positioned outside the housing 38. More specifically, the hand wheel 52 is located at one end 54 of the housing 38. The hand wheel 52 rotates in a plane at right angles to the longitudinal axis of the threaded rod 42.

FIG. 3 shows how the clamp 24 comprises two of the connecting members 26. The illustrated chain part 56 terminates in a hook 58. The chain part 56 extends over a guide sprocket 60. The chain part 56 extends between guide bars 62. The guide bars 62 are located at a bottom part 64 of the housing 38. A lower face of the bottom part 64 is provided with rubber feet 66 to ensure that the housing 38 does not mark a vehicle roof or other surface upon which the clamp 24 is placed. The rubber feet 66 may also help to locate between them the ladder 28.

As shown in FIG. 3, the gear wheel 46 may operate in roller ball rolling packers 68. The guide sprockets 60 may be sprung. The hand wheel 52 has a handle 70. Alternatively the hand wheel 52 may be replaced by a motorized drive means for rotating the threaded rod 42.

FIG. 2 shows how the clamp 24 may be provided with locking means 72 for locking the tightening means 20 in its tightened position, and thereby ensuring that the ladder 28 and the clamp 24 cannot be stolen by being removed from the roof rack 34. The locking means 72 comprises a locking bolt 74 which is slid backwards and forwards by pushing or pulling on a knob 76 which moves in a slot 78 in the housing 38. A padlock can be fitted through an aperture 80 in the locking bolt 74.

Figure 4:
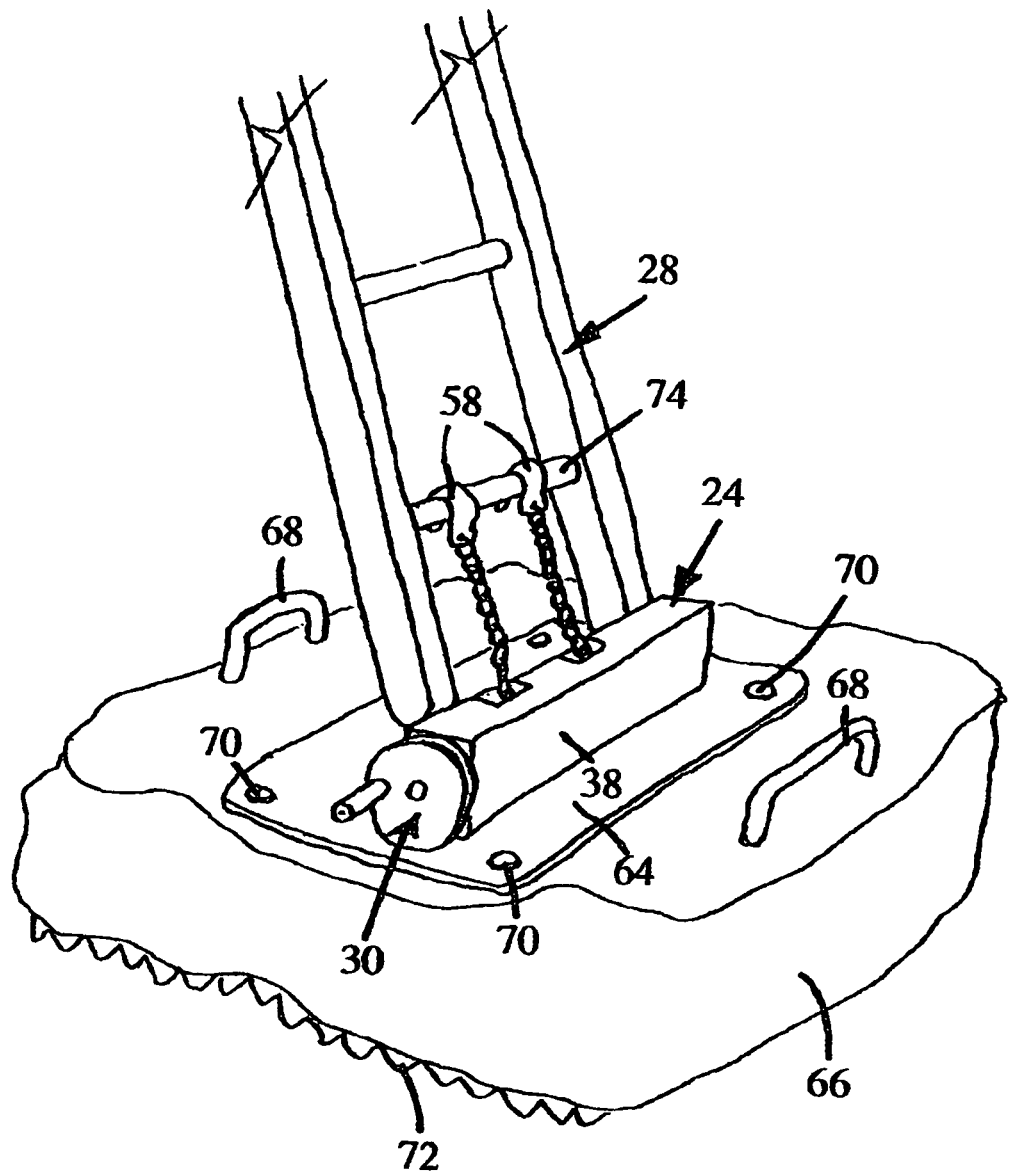
FIG. 4 shows a second clamp of the present invention.

FIG. 4 shows the clamp 24 with the housing 38 fixed to a plate 64. The plate 64 is fixed to a heavy anchor bag 66. The anchor bag 66 may be filled with sand or pea shingle. The anchor bag 66 is provided with handles 68 for enabling the anchor bag 66 to be moved. The plate 64 is secured to the anchor bag 66 by bolts 70. As can be seen from FIG. 4, the clamp 24 is thus able to clamp the ladder 28 to the anchor bag 66. The anchor bag 66 has an anti-slip rubber moulding 72 so that the ladder 28 can be securely held in position with the hooks 58 extending over a rung 74 of the ladder 28.

Figure 5:
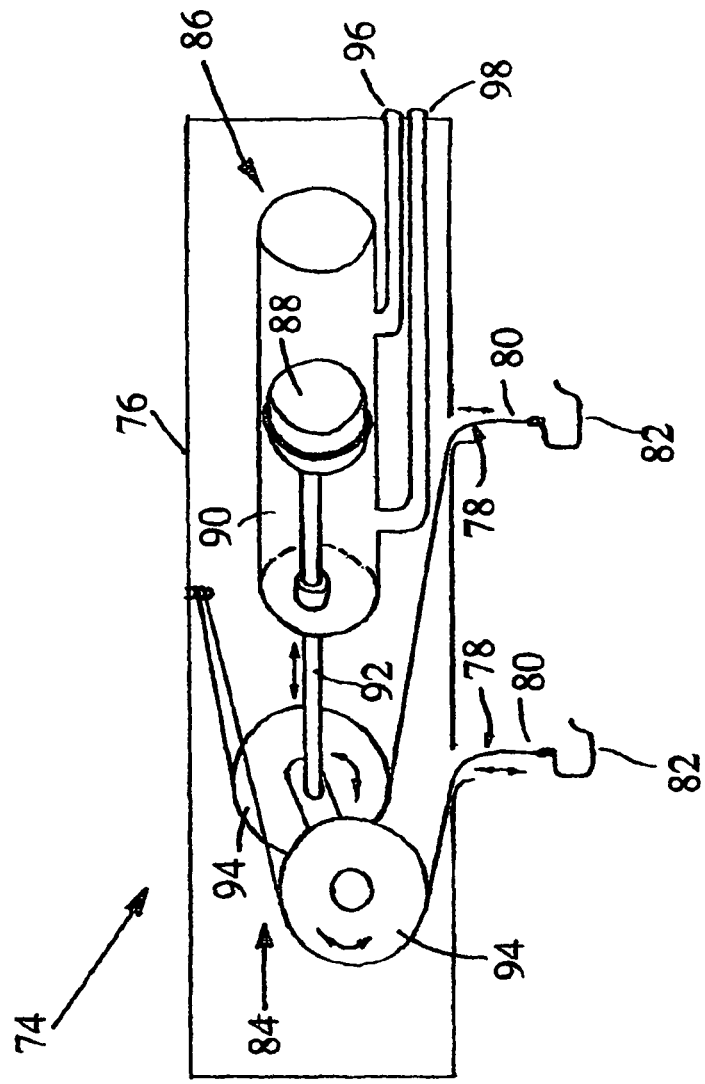
FIG. 5 shows a third clamp of the present invention.

FIG. 5 shows a clamp 74 with a housing 76. The clamp 74 has two flexible connecting members 78. The flexible connecting members 78 may comprise a chain or cable part 80 and a hook part 82.

The clamp 74 has tightening means 84. The tightening means 84 comprises operating parts 86 in the housing 76. The operating parts 86 including a piston 88 operating in a cylinder 90. The piston 88 has a piston rod 92 connected to pullies 94. The tightening means 84 is hydraulically operated by oil passing through inlet and outlet pipes 96, 98.

Figure 6:
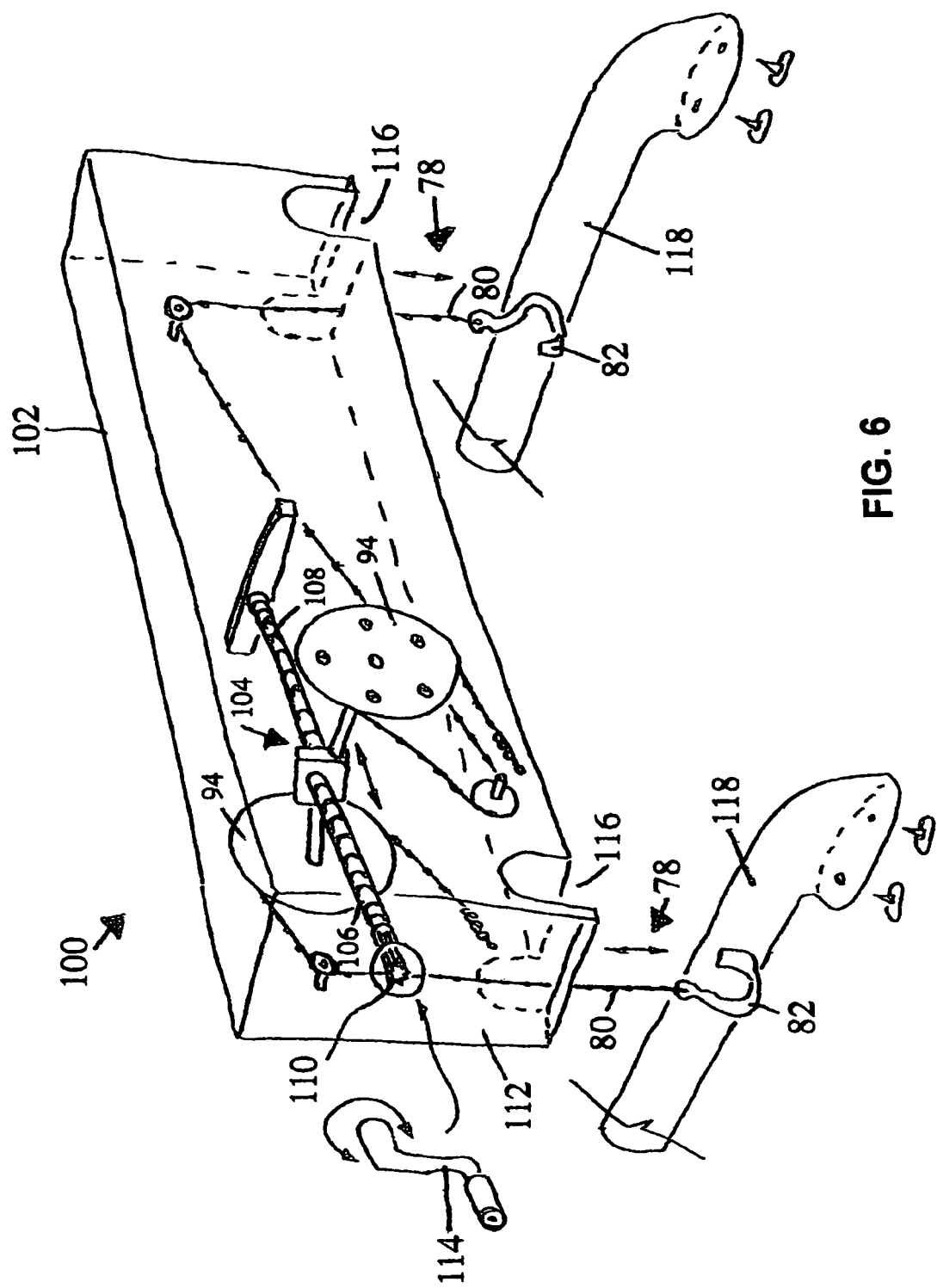
FIG. 6 shows a fourth clamp of the present invention.

FIG. 6 shows a clamp 100. The clamp 100 has a housing 102 and the connecting member 78 shown in FIG. 5. The pullies 94 are rotated by a threaded rod 104 having a first part 106 with a screw thread of one hand, a second part 108 with a screw thread of the opposite hand. The threaded rod 104 is turned by an axle member 110 extending from an end 112 of the housing 6. The axle member 110 is rotated by a removable handle 114 which keys to splines on the axle member 110. Alternatively, the axle member 110 may be rotated by a hand wheel 52 or by a motor. The housing 102 has recessed portions 116 for receiving fixed vehicle roof side bars 118. The hooks 82 hook under the hook side bars 118 as shown.

Figure 7:
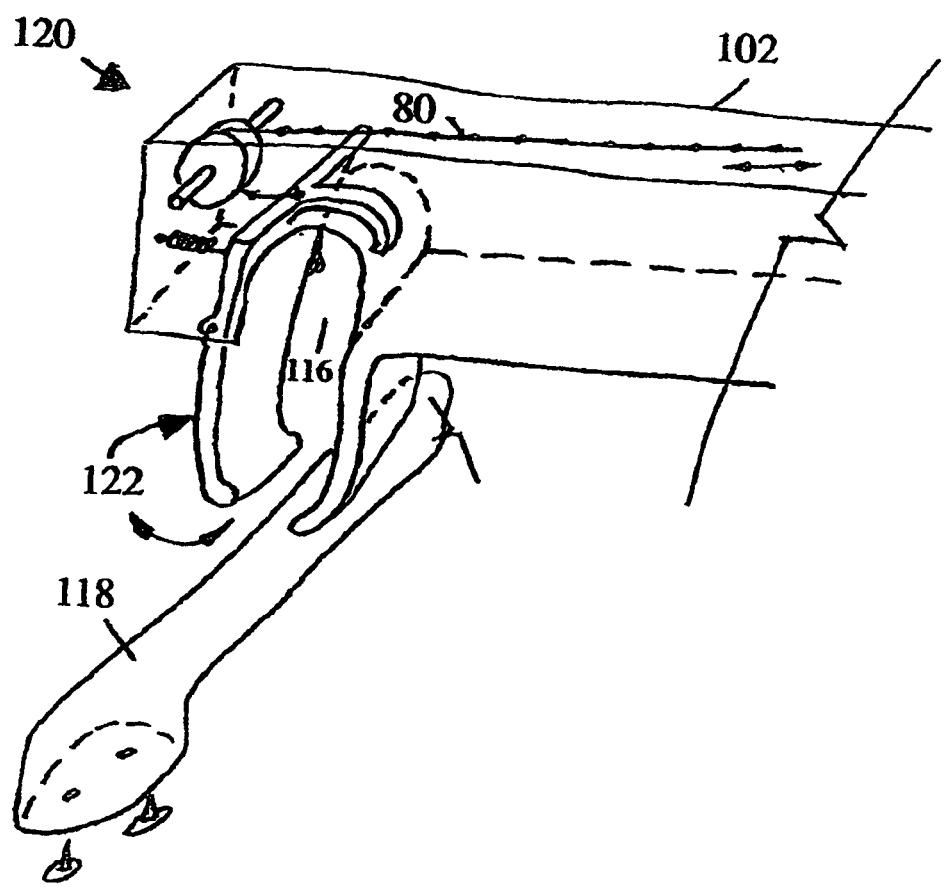
FIG. 7 shows part of a fifth clamp of the present invention.

FIG. 7 shows part of a clamp 120. The clamp 120 is a modified form of the clamp 100 shown in FIG. 6. The clamp 120 is such that the housing 102 has snap-on formations 122 adjacent the recesses 116. The snap-on formations 122 clip over roof side bars 118. Thus the clamp 120 is especially easy to fit because each snap-on formation 122 can be snapped over its roof side bar 118 from one side of the vehicle. It is only necessary to then spin the locking handle 114 or other turning device. The locking handle 114 or other turning device can then be removed from the splined end of the axle member 110 and stored in the vehicle for re-use when desired.

Figure 8:
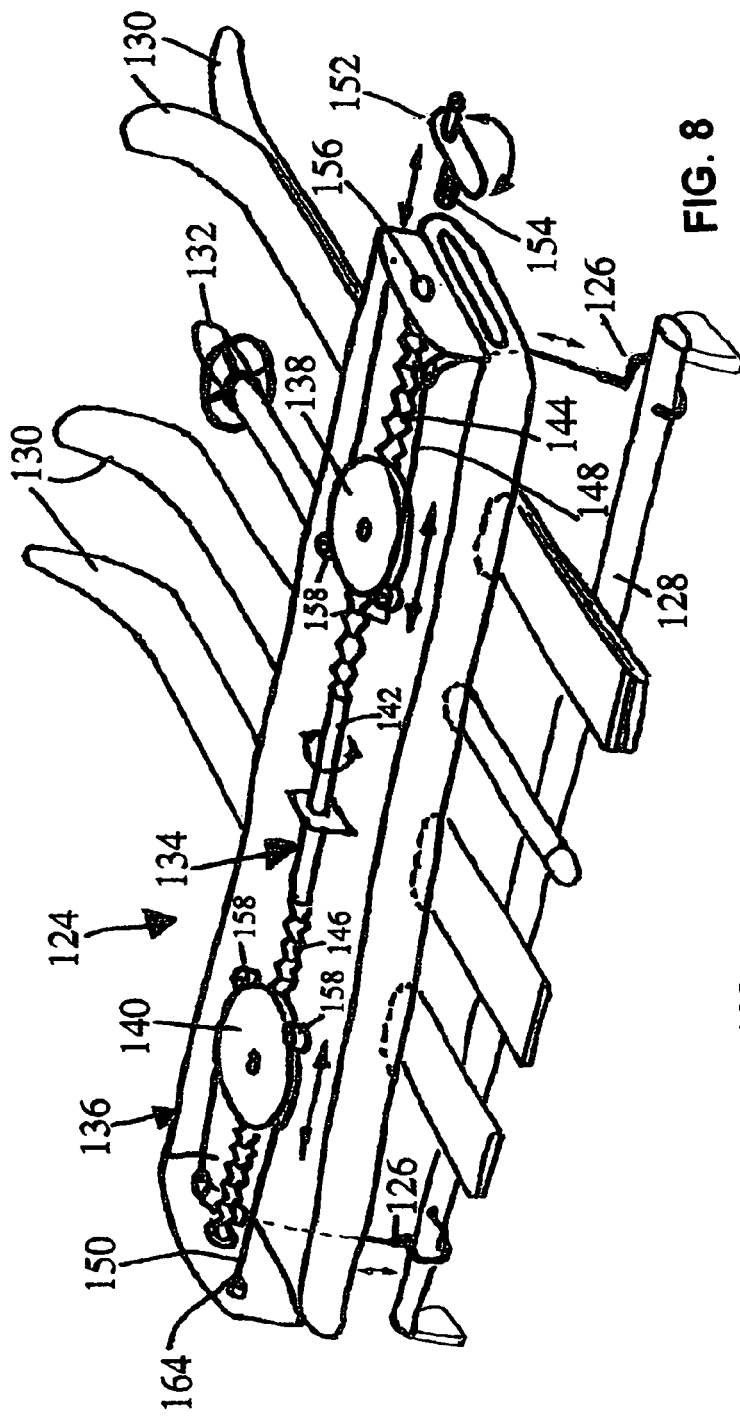
FIG. 8 shows a sixth clamp of the present invention.

FIG. 8 shows a clamp 124 comprising two connecting members 126. Each clamping member 126 connects to a cross bar 128 of a vehicle roof rack. The clamp 124 clamps skis 130 and a ski pole 132 to the cross bar 128 of the roof rack. The clamp 124 comprises tightening means 134 in a housing 136.

Figure 9:
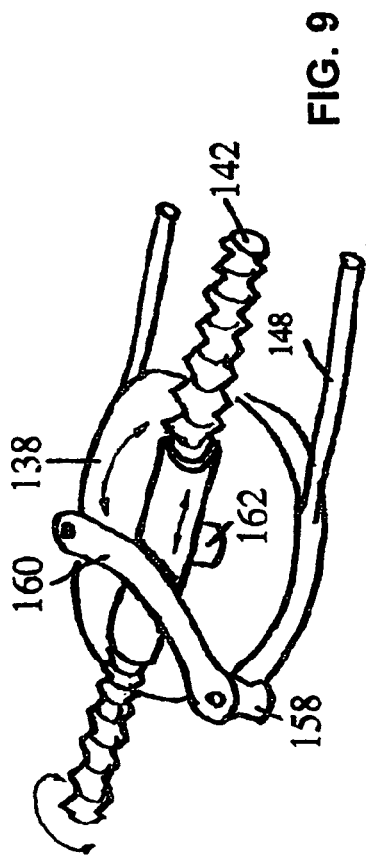
FIG. 9 is a view from underneath of one of the pullies shown in FIG. 8.

The tightening means 134 comprises two pullies 138, 140 which are mounted as shown on a rod 142 having two threaded portions 144, 146. The threaded portions 144, 146 are of opposite hand so that the pullies 138, 140 rotate appropriately such that the clamping members 126 which are in the form of the illustrated hooks are pulled together in unison upwardly towards the housing 136 or are allowed to extend from the housing 136 as they are connected to the cross bar 128. The clamping members 126 are connected to the pullies 138, 140 via flexible connecting members 148, 150 as shown. As the pullies 138, 140 are rotated, their flexible connecting member 148, 150 are wound around the pullies 138, 140 for the purpose of pulling the clamping members 126 towards the housing 136. Reverse rotation enables the flexible connecting members 148, 150 to extend out of the housing 136 for the required distance to connect onto the cross bar 128, or any other appropriate anchor member. Rotation of the rod 142 which causes rotation of the pullies 138, 140 is effected by a handle 152. The handle 152 has a splined shaft 154 which extends through an aperture 156 in the housing 136 and engages an end of the rod 142. As can be seen from FIGS. 8 and 9, the pullies 138, 140 rotate in rollers 158. The rollers 158 are connected by an arm 160 which extends underneath the rollers 138, 140, as shown in FIG. 9. The rod 142 is connected to a shaft 162 for rotating the pullies, again as shown in FIG. 9. The flexible connecting members 148, 150 are shown as wire cords. The flexible connecting members 148, 150 are each secured at one end 164 to the housing 136, with their other end passing through the housing and connecting to the clamping members in the form of the hooks 126.

FIGS. 10 and 11 show a clamp 166 having a handle 168, clamping members 170, and tightening means 172. The tightening means 172 is located in a housing 174 in the form of a travel box for fitting on a vehicle roof and for containing whatever products are required, for example tools. There are four of the clamping members 170 with each clamping member 170 being connected by flexible connecting members 176 to the tightening means 172. The flexible connecting means 176 are in the form of wire cords. Tightening and untightening of the flexible connecting members 176 is effected by the handle 168 appropriately rotating the tightening means 172. The tightening means 172 comprises rollers 178 and threaded rod 180. The rod 180 is mounted for rotation against a plate 182. On the other side of the plate 182 is a tension spring 184. A clamp block 186 secured by screws 188 to the floor 190 of the housing 174. A flexible arm 192, for example made of rubber or an appropriate plastics material, grips a roof rack cross bar 194 when the clamp is tightened, as can be appreciated from a comparison of FIGS. 10 and 11. A comparison of FIGS. 10 and 11 also shows how a slide member 196 slides to engage the cross bar 194. It can be seen that during tightening, the clamping members 170 which are in the form of closed loops are each able to fit over a hook 198 forming part of the slide member 196.

FIGS. 12 and 13 show a clamp 200 comprising a handle 202 which rotates a threaded rod 204. The threaded rod 204 rotates tightening means 206 comprising two pullies 208. Each pulley 208 has a' flexible connecting member 210. The flexible connecting members 210 are in the form of wire cords. The wire cords pass through guides 212. The tightening means 206 is located between upstanding plates 214, 216. The plate 214 has a hole 218 for receiving a padlock (not shown) onto a jockey wheel 234. The flexible connecting members 210 terminate in clamping members 220 in the form of hooks. The guides 212 extend between the plate 216 and a floor 222 of the clamp 200. The floor 222 forms part of a housing for the clamp 200. FIG. 13 shows a top part 224 of the housing, with the plate 216 extending between the floor 222 and the top part 224, and forming a bulkhead. FIG. 12 shows how a roller arrangement 226 keeps the flexible connecting members 210 in place in the pullies 208. FIG. 12 also shows how tension springs 228 are employed to keep tension in the flexible connecting members 210. Stop members 230 are employed as shown.

Figure 14:
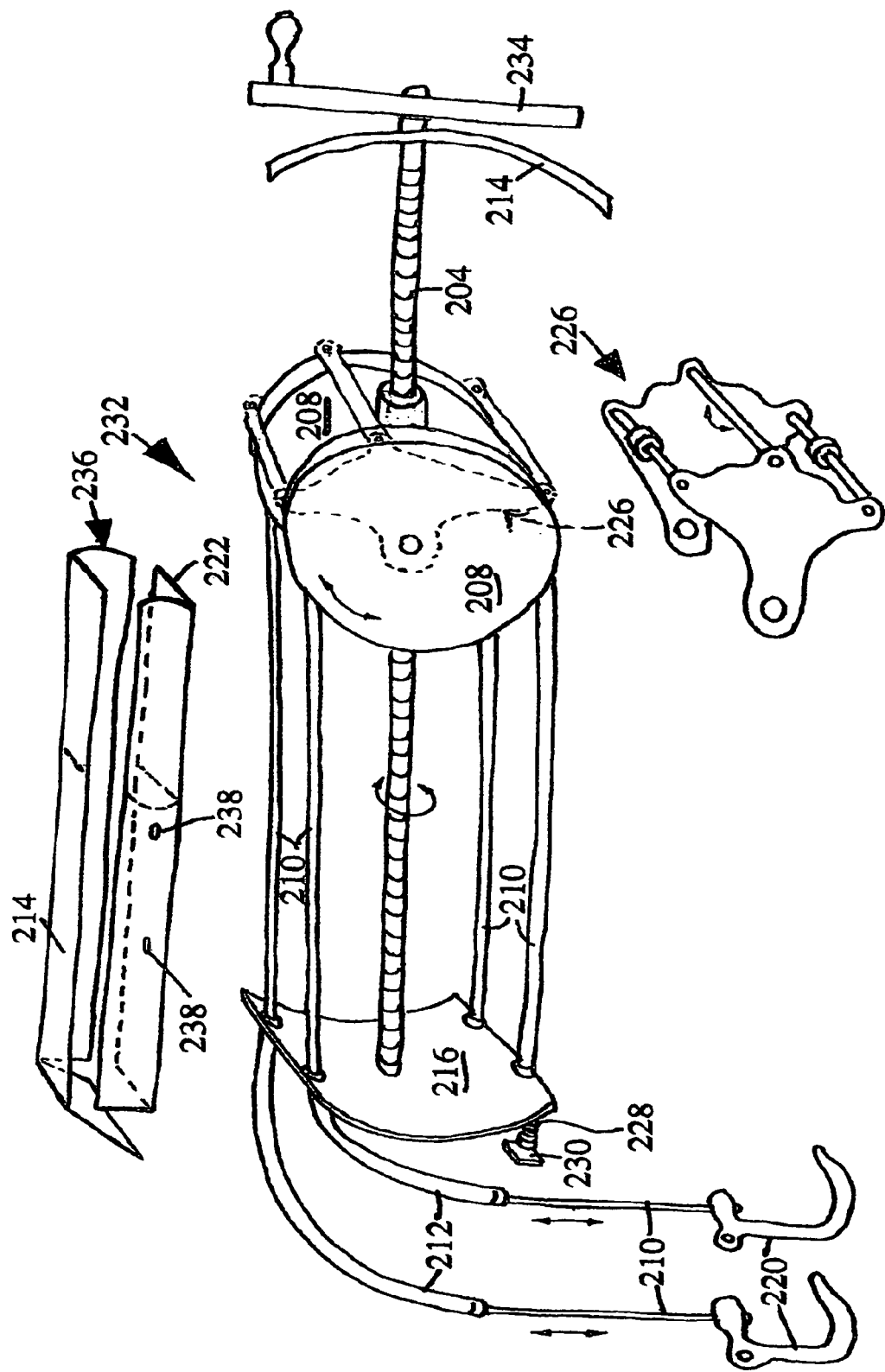
FIG. 14 is a view with exploded parts of a ninth clamp device of the present invention.

FIG. 14 shows a clamp 232 which is like the clamp 200 shown in FIGS. 12 and 13. Similar parts as in FIGS. 12 and 13 have been given the same reference numerals for ease of comparison and understanding. FIG. 14 shows in more detail the formation of the roller arrangement 226, and it also shows in side view the jockey wheel 234. The plate 214 in FIG. 14 is shown as curved, whereas the plate 214 in FIG. 12 is straight. The plates 214 form end bulkheads. Similarly, the plate 216 in FIG. 14 is shown as curved, whereas the plate 216 in FIGS. 12 and 13 is shown as straight. The flexible connecting members 210 may be coated wire ropes, or wire cords. FIG. 14 also shows how the housing 236 may be formed in two parts. The floor 222 is shown as having conduit fixing holes 238.

FIG. 15 shows a tightening means 240 in the form of a hook having a protector device 242. The protector device 242 may be made of rubber or a plastics material and it is for protecting the top of a vehicle such for example as the top of a van. The tightening means 240 is shown tightened around a crossbar 244 of a roof rack. The crossbar 244 can be circular or rectangular as shown. FIG. 15 also shows the tightening means 240 provided with a plastics locator grip 246.

FIG. 16 shows two of the tightening means 240 shown in FIG. 15 with their flexible connecting members 210 passing through guides 212. The guides 212 are shown held in position by welds 248.

FIG. 17 shows a flexible connecting member 210 in the form of a wire cord provided with a tension spring 228. The tension spring 228 is positioned between washers 250. An end 252 of the flexible connecting member 210 abuts against a stop member 230.

Figure 18:
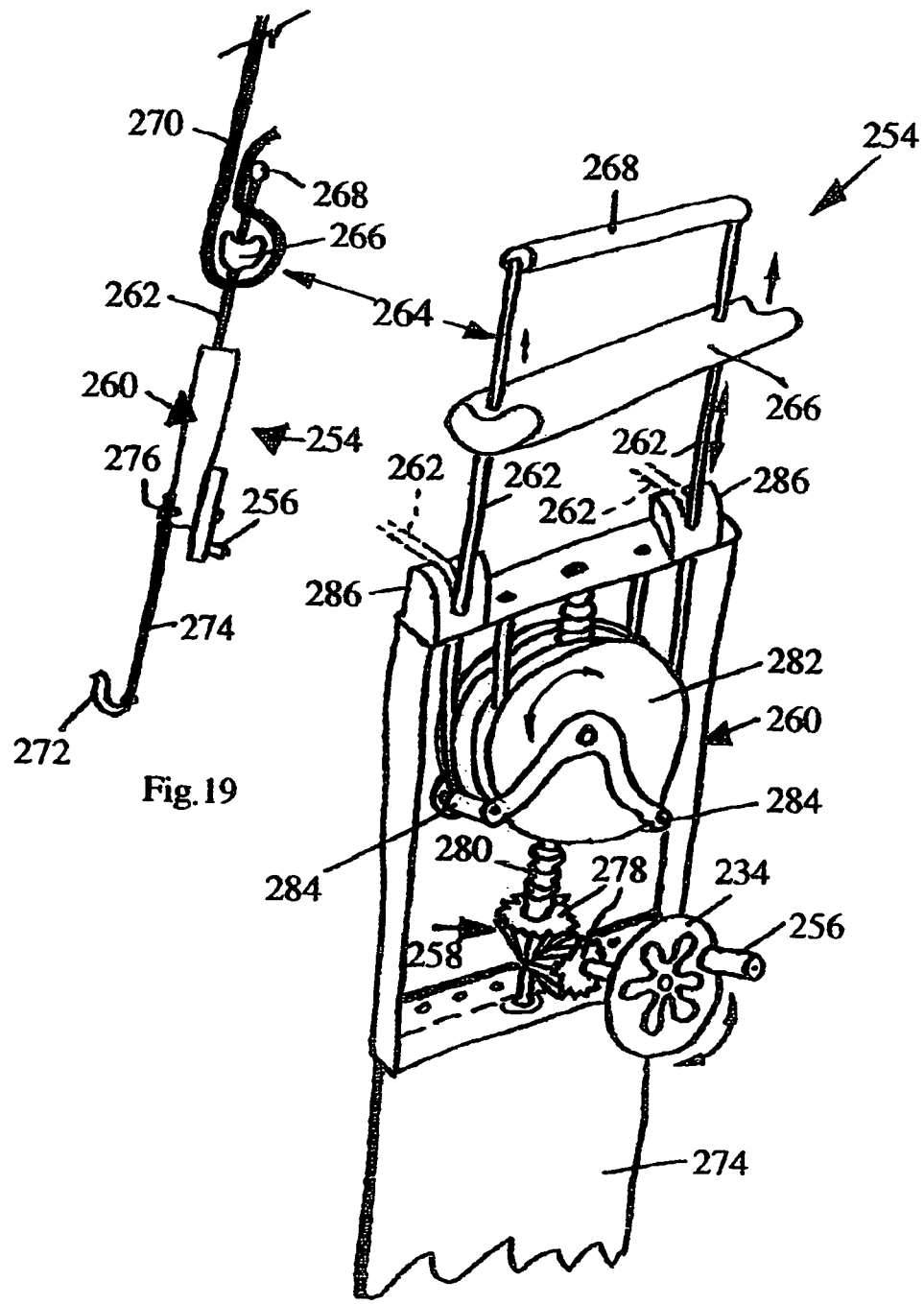
FIG. 18 shows a tenth clamp of the present invention.

FIGS. 18 and 19 show a clamp 254 having a handle 256, tightening means 258, a housing 260 and flexible connecting members 262. The flexible connecting members 262 are in the form of wire cords. The clamp 254 has a clamping arrangement 264 in the form of a slide bar 266 and an end bar 268. Strapping 270 passes through the slide bar 266 and the end bar 268 as shown in FIG. 19. A clamping member 272 is in the form of a hook which is connected to a strap 274. The strap 274 is connected to the housing 260 by screws, rivets or other connecting members 276 as shown in FIG. 19. As shown in FIG. 18, the hand 256 rotates a pair of pinion gears 278 to cause a rod 280 to rotate. Rotation of the rod 280 appropriately rotates a pulley 282. The pulley 282 has rollers 284 for keeping the flexible connecting members 262 in the pulley. The clamp 254 also has guide blocks 286 for use in case the clamp is needed to operate at right angles as indicated by the broken lines for the flexible connecting members 262.

It is to be appreciated that the embodiments of the invention described above with reference to the accompanying drawings have been given by way of example only and that modifications may be effected. Thus, for example, the shape of the housings 38, 76, 102 may be different from the illustrated flat sided housings of square cross section. Also, other types of housings, connecting members, tightening, loosening and tensioning means may be employed. Instead of using a complete pulley as shown in the drawings, the clamp of the present invention may alternatively use a half circular formation for tensioning the flexible connecting member. The half circular formation may include a guide conduit or rollers.

The invention claimed is:

1. A portable clamp for clamping an article to an anchor member, the clamp comprising:
    a housing having a rod extending longitudinally therein,
    at least one connecting member extendable from and retractable into the housing for connecting the clamp to the article, and
    a tightening element located within the housing for tightening the connecting member and thereby causing the clamp to clamp the article to the anchor member, wherein the tightening element comprises a gear wheel that is translatable along a longitudinal axis of the rod and is connected to the connecting member so as to extend or retract the connection member from the housing during translation of the gear wheel along the rod.

2. The portable clamp according to claim 1, wherein the housing comprises a guide slot and the gear wheel is further connected to support an arm that is pivotable within the guide slot in the housing.

3. The portable clamp according to claim 1, further comprising a hand wheel positioned outside the housing and wherein the rod is a threaded rod that is rotatable by the hand wheel.

4. The portable clamp according to claim 3, wherein the hand wheel is located at one end of the housing, and wherein the hand wheel rotates in a plane at right angles to the longitudinal axis of the threaded rod.

5. The portable clamp according to claim 1, wherein the connecting member is a chain or a cable.

6. The portable clamp according to claim 5, wherein the chain or cable terminates in a hook.

7. The portable clamp according to claim 1, wherein the housing has flat sides, and is of a square or rectangular cross section.

8. The portable clamp according to claim 1, further including a lock configured to lock the tightening element in a tightened condition.

* * * * *